(12) United States Patent
Bennett et al.

(10) Patent No.: US 9,202,074 B1
(45) Date of Patent: Dec. 1, 2015

(54) PROTECTION OF SHARED DATA

(71) Applicant: IONU SECURITY, INC., Campbell, CA (US)

(72) Inventors: David W. Bennett, Longmont, CO (US); Timothy E. Beres, Boulder, CO (US)

(73) Assignee: IOnU Security, Inc., Longmont, CO (US)

( * ) Notice: Subject to any disclaimer, the term of this patent is extended or adjusted under 35 U.S.C. 154(b) by 13 days.

(21) Appl. No.: 14/176,752

(22) Filed: Feb. 10, 2014

(51) Int. Cl.
*G06F 21/62* (2013.01)
*G06F 21/60* (2013.01)
*H04L 29/06* (2006.01)

(52) U.S. Cl.
CPC .............. *G06F 21/62* (2013.01); *G06F 21/602* (2013.01); *G06F 21/6209* (2013.01); *G06F 21/6218* (2013.01); *H04L 63/10* (2013.01); *H04L 63/104* (2013.01)

(58) Field of Classification Search
CPC ... G06F 21/6218; G06F 21/62; G06F 21/602; G06F 21/6209; G06F 2221/2107; H04L 63/10; H04L 63/101; H04L 63/104; H04L 63/105
See application file for complete search history.

(56) References Cited

U.S. PATENT DOCUMENTS

| | | | |
|---|---|---|---|
| 2004/0030930 A1* | 2/2004 | Nomura | 713/201 |
| 2007/0230706 A1* | 10/2007 | Youn | 380/277 |
| 2008/0089517 A1* | 4/2008 | Bianco et al. | 380/259 |

* cited by examiner

*Primary Examiner* — Minh Dinh
*Assistant Examiner* — Arya Golriz
(74) *Attorney, Agent, or Firm* — Crawford Maunu PLLC

(57) ABSTRACT

Approaches for protecting a data element are disclosed. The method includes encrypting the data element with a first key on a first client system. A set of permissions is stored in association with the encrypted data element, and a first signature is generated from the set of permissions for the data element. The first key is encrypted with a second key on the first client system. The encrypted first key is stored in association with the encrypted data element, and the second key is encrypted with a public key of a public-private key pair of a first user on the first client system. The first signature and the encrypted second key are transmitted from the first client system to a server system for storage.

15 Claims, 4 Drawing Sheets

PROTECTION OF SHARED DATA

FIELD OF THE INVENTION

One or more embodiments generally relate to security of shared data.

BACKGROUND

Collaborative development of various documents had traditionally been done within the confines of a secure network, such as that of a corporation or other business entity. For example, reports, product requirements, and other documents were created and revised by users accessing the secure network. With the advent of high-speed communications and mobile devices such as notebook computers, tablet computers, and smart phones, collaborative development has been extended beyond secure networks.

Extra security measures are often employed with documents being accessed beyond the secure network. For example, data authentication and encryption may be used to ensure that data is received from a trusted source and has not been tampered with, and that the data cannot be intercepted and accessed by an unauthorized party.

Managing the authentication and encryption keys is challenging when a particular document may be accessed by many different users, and each user may access that document with a number of different devices. Not only must the security of the document be maintained, but the security mechanism must not be so cumbersome that it creates undue burdens on those accessing the document.

SUMMARY

A method of protecting a data element is disclosed as an example implementation. The method includes encrypting the data element with a first key on a first client system. A set of permissions is stored in association with the encrypted data element, and a first signature is generated from the set of permissions for the data element. The first key is encrypted with a second key on the first client system. The encrypted first key is stored in association with the encrypted data element, and the second key is encrypted with a public key of a public-private key pair of a first user on the first client system. The first signature and the encrypted second key are transmitted from the first client system to a server system for storage.

A system for protecting a data element is disclosed as another implementation. The system includes at least one processor and a memory. The memory is configured with instructions that when executed by the at least one processor cause the at least one processor to perform operations including encrypting the data element with a first key and storing a set of permissions in association with the encrypted data element. The processor generates a first signature from the set of permissions for the data element, encrypts the first key with a second key, and stores the encrypted first key in association with the encrypted data element. The second key is encrypted by the processor with a public key of a public-private key pair of a first user, and the processor transmits the first signature and the encrypted second key to a server system for storage.

Other embodiments will be recognized from consideration of the Detailed Description and Claims, which follow.

BRIEF DESCRIPTION OF THE DRAWINGS

Various aspects and advantages of the disclosed embodiments will become apparent upon review of the following detailed description and upon reference to the drawings in which.

DETAILED DESCRIPTION OF THE DRAWINGS

The disclosed methods and systems provide protection for a data element. The data element may be any type of data that is shared by multiple users or accessed by different devices of one user. Such data may include program files, textual documents, spreadsheets, slide shows, video and/or audio data, or any other type of data that is shared or accessed by multiple devices.

The data element is encrypted with a file encryption key (FEK), with a set of permissions being stored in association with the encrypted data element. The permissions indicate which users have which type of access to the data element. For example, the permissions indicate whether the user has read access or read and write access. A signature is generated from the set of permissions associated with the data element.

The FEK is encrypted with a shared key, and the encrypted FEK is stored in association with the encrypted data element. The shared key is encrypted with a public key of a public-private key pair of a user. For a data element that is shared by multiple users, multiple encrypted versions of the shared key may be generated by encrypting the shared key with the public keys of the different users. The signature and the encrypted shared key are provided to a server system for storage. If multiple encrypted versions of the shared key are generated, those encrypted keys are also transmitted to the server for storage. The encrypted shared keys are stored by the server in association with the signature. A signature and associated keys may be referred to as a key ring in this description.

The encrypted data element and encrypted FEK may be distributed between devices or users via any one of a number of different channels. For example, the encrypted data element and encrypted FEK may be shared on a file server, distributed by email, or shared via near field communication.

To read the encrypted data element by a particular user, the user's private key is used to decrypt the encrypted shared key, which had previously been encrypted with the user's public key. The encrypted shared key may be obtained from the server or may be locally stored on the user's device on a key ring for the data element. The decrypted shared key is then used to decrypt the encrypted FEK that accompanies the encrypted data element, and the decrypted FEK is used to decrypt the encrypted data element.

Figure 1:
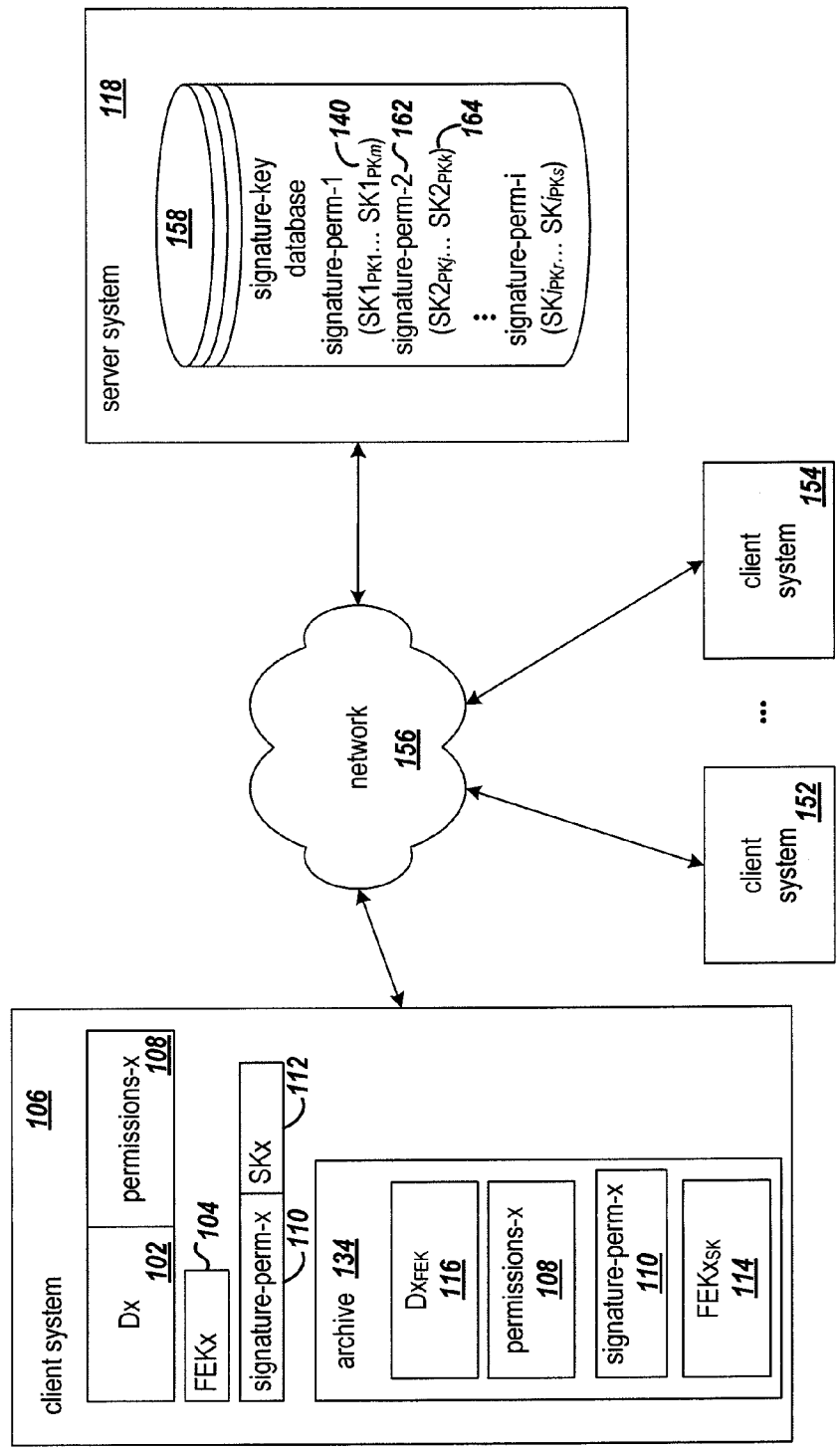
FIG. 1 is a block diagram that shows a computing arrangement in which a data element is shared by multiple devices and/or users.

FIG. 1 is a block diagram that shows a computing arrangement in which a data element is shared by multiple devices and/or users. Though only one data element is illustrated, it will be appreciated that the methods and systems may be readily extended to support the sharing of multiple data elements. The computing arrangement includes multiple client systems 106, 152, and 154 that are communicatively coupled to a server system 118 by a network 156, such as the Internet. The client systems share access to data element Dx 102.

Client system 106 is shown as being the system on which data element Dx 102 is created. Permissions 108 (permissions-x) are stored in association with the data element Dx.

The permissions indicate which users have read access or read and write access to the data element. A signature 110 is generated from the permissions 108. In an example implementation, the permissions are represented using Java-script object notation (JSON), and the signature is an MD5 hash of the left-most 12 bytes.

Data element Dx 102 is encrypted using a file encryption key (FEKx) 104, and the FEKx is encrypted using a shared encryption key (SKx) 112. The encrypted FEKx ($FEKx_{SK}$) is stored in association with encrypted data element Dx ($Dx_{FEK}$). In an example implementation, the $FEKx_{SK}$ 114 and $Dx_{FEK}$ 116, along with permissions-x 108 and signature-perm-x 110, are stored in archive 134, such as a POSIX tar format archive.

In an example implementation, the file encryption key FEK is a random 256-bit AES key (also referenced as random number) and is unique for every archive. The shared key SK may also be a random 256-bit AES key. An archive may have more than one encrypted data element. For example, multiple shared documents may be stored in the same archive. The FEK may be generated by obtaining 32 bytes of random data from the OpenSSL Rand interface, for example. The FEK is only retentively stored in encrypted form. The FEK is not stored in retentive storage (e.g., disk) in plaintext form and is shredded from RAM of the client system when it is no longer needed.

The shared key SKx 112 is encrypted on the client system using a public key of a public-private key pair of the owner or creator of the data element Dx 102. The shared key SKx may also be encrypted with the public keys of the other users who will be sharing access to the data element, thereby creating multiple instances of the encrypted shared key. The encrypted shared key(s) is transmitted along with the signature 110 to the server system 118 for storage.

In one implementation, the server system maintains a database 158 of signatures and associated sets of encrypted shared keys. Each signature covers an archive, and the associated set of encrypted shared keys are for those users who are permitted access to the data element in the archive. In the example database 158, signature-perm-x 110 from the client system is stored as one of the signatures signature-perm-1-signature-perm-i. For purposes of referencing the encrypted shared keys in FIG. 1, the label for each encrypted shared key identifies the data element with which it is associated and the user whose public key was used to encrypt the shared key. For example, the label of shared key 140 is $SKI_{PKm}$, which indicates that the shared key is for data element 1 and is encrypted with the public key of user m.

The same signature will be generated for all data elements that have the same permissions. If the permissions are the same, the same set of people are allowed to access the data element, so the same shared key may be used. In this way, the local key ring can be kept fairly small. For data elements with same permissions, a server need not be repeatedly queried for the shared key.

Once the archive 134 has been created and the signature and associated encrypted versions of the shared key have been established at the server, the data element may be shared between users at the client systems 106, 152, and 154. As indicated above, the archive may be shared by way of a file server, email, or various other forms of file transfer.

When the archive has been established at a client system for reading, the client system needs to have the shared key in order to decrypt the encrypted $FEKx_{SK}$ 114 from the archive. The client system checks whether or not the signature of the permissions 110 in the archive matches a locally stored signature, which has associated encrypted shared keys. If the signature is not locally stored, the client system obtains the signature and associated encrypted shared keys from the server system 118. The user who is requesting to read the data element provides his private key, and the private key is used to decrypt the encrypted shared key. For example, if the data element is data element 2, the signature-perm-2 162 has associated encrypted shared keys 164, and the client system decrypts the one of shared keys 164 that belongs to the user with the user's private key. Note that the encrypted shared keys may be tagged with information that identifies the user whose public key was used to encrypt the shared key so that the proper encrypted shared key may be decrypted.

Using the decrypted shared key, the client system decrypts the encrypted file encryption key $FEKx_{SK}$ 114 from the archive. The decrypted FEK is then used by the client system to decrypt the encrypted data element $Dx_{FEK}$ 116 from the archive.

Figure 2:
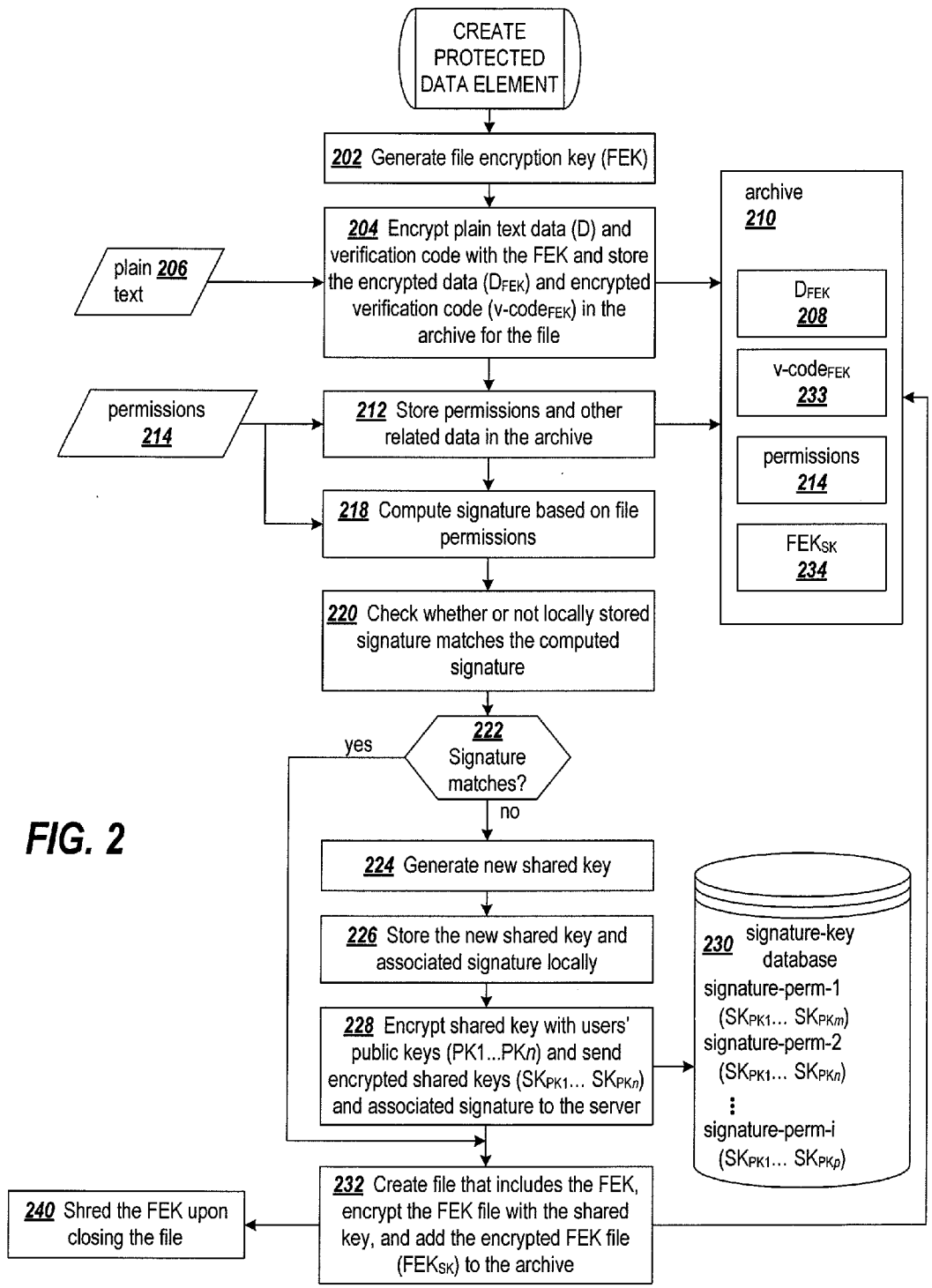
FIG. 2 is a flowchart of a process for creating a protected data element.

FIG. 2 is a flowchart of a process for creating a protected data element. At block 202, a file encryption key (FEK) is generated to be used to encrypt the data element. The FEK is a random 256-bit AES key and may be generated by obtaining 32 bytes of random data from the OpenSSL Rand interface as indicated above. At block 204, the plain text data element 206 is encrypted using the FEK. In addition, a verification code may be encrypted using the FEK. The verification code may be subsequently used for authentication purposes when attempting to read the encrypted data element. In an example implementation, the verification code may be generated from a hash function, such as MD5 of SHA-2, applied to the plaintext data element. Both the encrypted data element $D_{FEK}$ 208 and the encrypted verification code $v\text{-code}_{FEK}$ 233 are stored in the archive 210. In an example implementation, the archive file is a POSIX tar format file. It will be appreciated that other proprietary or open source types of archives or containers may be suitable.

The permissions 214 and other related data are also stored in the archive 210 at block 212. The related data may include metadata that describe the data element and/or archive, such as version number, date/time of last modification, device on which the data element was last modified, the owner of the archive, date/time that the archive was created, identification of the encryption algorithm employed to encrypt the data element, a file type, and size, for example. Other related data may include keywords and thumbnails.

At block 218, a signature is calculated from the permissions 214, which control access to the data element. In an example implementation, the signature is the left-most 12-bytes of the MD5 hash of an ordered JSON string that represents the permissions. Block 220 checks whether or not the generated signature matches a previously generated signature stored locally at the client. If the generated signature does not match any locally stored signature, decision block 222, a new shared key needs to be generated, and the process is directed to block 224.

A new shared key is generated at block 224. The shared key is a random 256-bit AES key and may be generated by obtaining 32 bytes of random data from the OpenSSL Rand interface as indicated above. At block 226, the shared key is stored locally on the client system in association with the generated signature. The local storage of the signature and shared key is in volatile RAM and not in retentive (e.g., disk) storage of the client system. Once the shared key is no longer needed by the client system, it is shredded. That is, the memory occupied by the shared key may be overwritten with irrelevant data.

At block 228, the new shared key is encrypted with the public keys of those users identified in the permissions as having access to the data element. That is, for each user, the shared key is encrypted with that user's public key and that encrypted shared key is saved so that the user can later decrypt the encrypted FEK. Also at block 228, the encrypted shared keys and associated signature are transmitted to the server system for storage in a signature-key database 230.

A file is created to store the FEK, and that file is encrypted using the shared key at block 232. The encrypted FEK file $FEK_{SK}$ 234 is also added to the archive 210 at block 232. Upon closing the archive, the FEK is shredded at block 240. That is, once access to the archive and its contents is no longer needed on the client system, the memory occupied by the FEK may be overwritten with irrelevant data.

Figure 3:
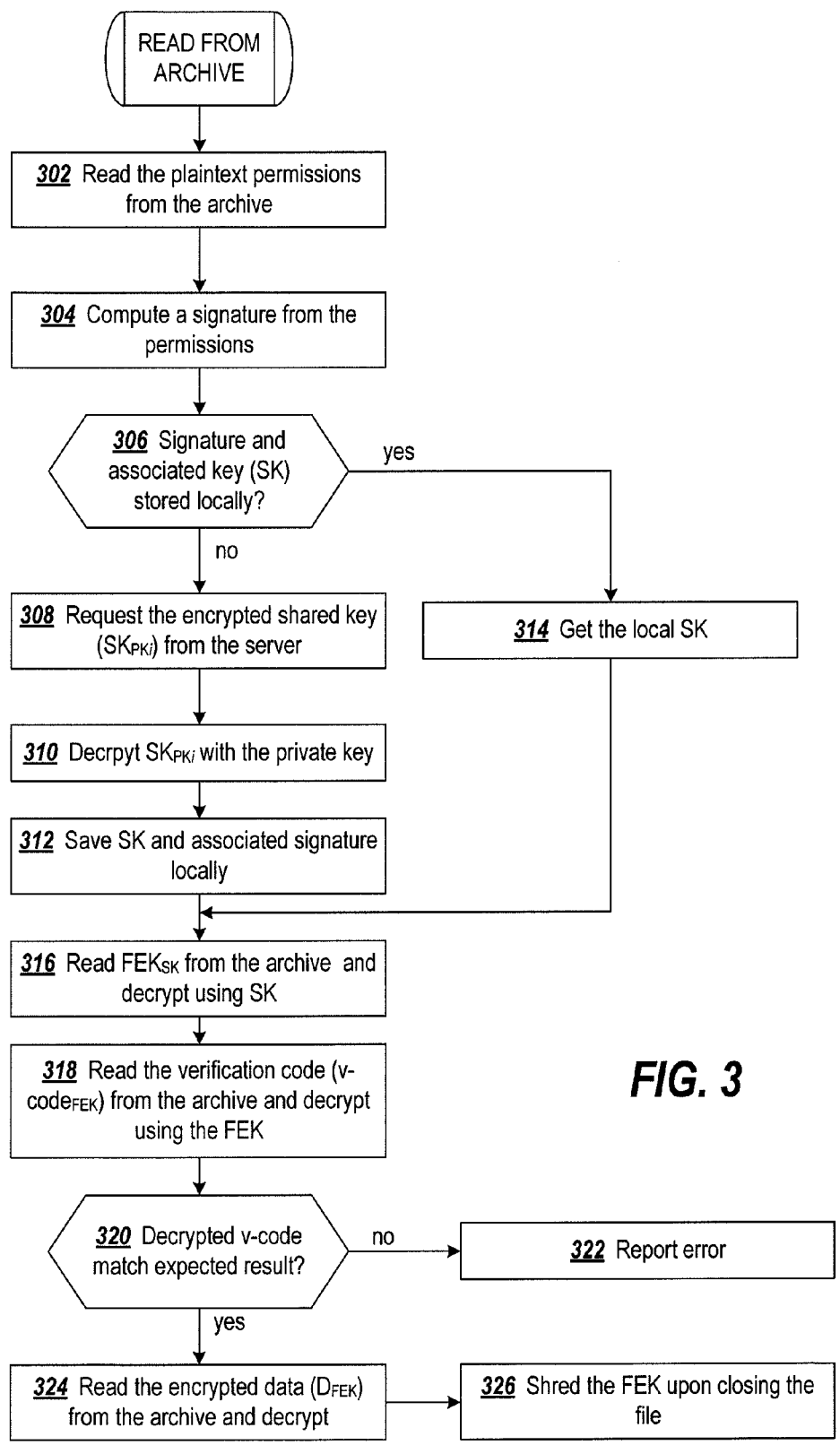
FIG. 3 is a flowchart of a process for reading a protected data element.

FIG. 3 is a flowchart of a process for reading a protected data element. As indicated above, the data element and archive may be shared through a variety of channels and protocols. At block 302, the permissions are extracted from the archive, and a signature of the permissions is computed at block 304. If the computed signature does not match a locally stored signature, decision block 306 directs the process to block 308 where the client system requests the encrypted shared key from the server system. For example, the encrypted shared key for user i would be $SK_{PKi}$. The request to the server system includes the computed signature so that the server system can retrieve the associated set of keys.

At block 310, the encrypted shared key $SK_{PKi}$ returned from the server system is decrypted with the user's private key, and the decrypted shared key SK is stored locally along with the signature at block 312. If the computed signature had previously been stored at the client system, decision block 306 directs the process to block 314 where the associated shared key is obtained.

At block 316, the encrypted file encryption key $FEK_{SK}$ is read from the archive and decrypted using the shared key, which was obtained at either block 310 or block 314. The encrypted verification code (v-code$_{FEK}$) is read from the archive and decrypted using the FEK at block 318. If the decrypted v-code matches the expected result, decision block 320 directs the process to block 324 to read the encrypted data element ($D_{FEK}$) from the archive and decrypt $D_{FEK}$ using the FEK. At block 326, the FEK is shredded when it is no longer needed. If the decrypted v-code does not match the expected result, an error is reported at block 322.

Figure 4:
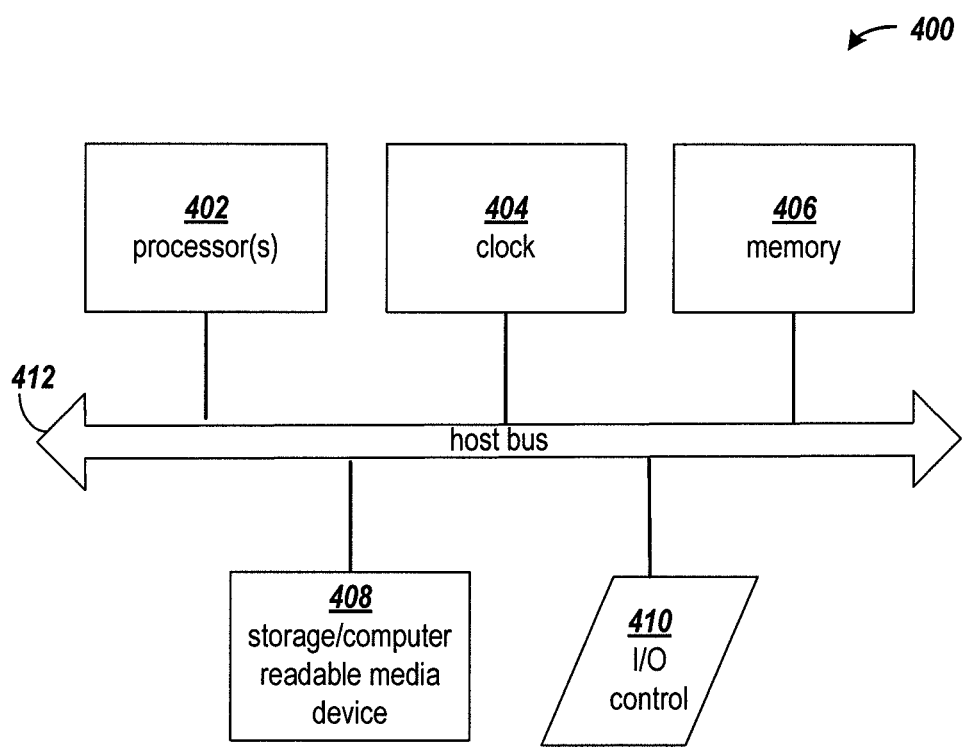
FIG. 4 is a block diagram of an example computing arrangement on which the processes described herein may be implemented.

FIG. 4 is a block diagram of an example computing arrangement on which the processes described herein may be implemented. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 400 includes one or more processors 402, a clock signal generator 404, a memory arrangement 406, a storage arrangement 408, and an input/output control arrangement 410, all coupled to a host bus 412. The arrangement 400 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 402 may be one or more general purpose processors, or a combination of one or more general purpose processors and suitable co-processors, or one or more specialized processors (e.g., RISC, CISC, pipelined, etc.).

The memory arrangement 406 typically includes multiple levels of cache memory, and a main memory. The storage arrangement 408 may include local and/or remote persistent storage, such as provided by magnetic disks (not shown), flash, EPROM, or other non-volatile data storage. The storage unit may be read or read/write capable. Further, the memory arrangement 406 and storage arrangement 408 may be combined in a single arrangement.

The processor(s) 402 executes the software in storage arrangement 408 and/or memory arrangement 406, reads data from and stores data to the storage arrangement 408 and/or memory arrangement 406, and communicates with external devices through the input/output control arrangement 410. These functions are synchronized by the clock signal generator 404. The resource of the computing arrangement may be managed by either an operating system (not shown), or a hardware control unit (not shown).

Though aspects and features may in some cases be described in individual figures, it will be appreciated that features from one figure can be combined with features of another figure even though the combination is not explicitly shown or explicitly described as a combination.

The methods and systems are thought to be applicable to a variety of systems for securing shared data. Other aspects will be apparent to those skilled in the art from consideration of the specification. The methods and systems may be implemented as one or more processors configured to execute software, as an application specific integrated circuit (ASIC), or as a logic on a programmable logic device. It is intended that the specification and illustrated embodiments be considered as examples only, with a true scope of the invention being indicated by the following claims.

What is claimed is:

1. A method of protecting a data element, comprising:
   encrypting the data element with a first key on a first client system;
   storing a set of permissions in association with the encrypted data element;
   generating a first signature from the set of permissions for the data element;
   after the generating of the first signature, determining whether a stored signature on the first client system matches the first signature;
   in response to determining that no stored signature matches the first signature:
   generating a second key; and
   storing the second key in association with the first signature on the first client system;
   encrypting the first key with the second key on the first client system;
   storing the encrypted first key in association with the encrypted data element;
   encrypting the second key with a public key of a public-private key pair of a first user on the first client system; and
   transmitting the first signature and the encrypted second key from the first client system to a server system for storage.

2. The method of claim 1, further comprising storing the encrypted data element, first signature, encrypted first key, and set of permissions in an archive file.

3. The method of claim 1, further comprising:
   for each user of a plurality of users permitted access to the data element, encrypting the second key into a respective encrypted second key with a public key of a respective public-private key pair of the user; and transmitting the encrypted second key to the server system for storage in association with the first signature.

4. The method of claim 3, further comprising:
storing the encrypted data element, first signature, encrypted first key, and set of permissions in an archive file;
in response to a request to access the data element by a second user at a second client system:
  extracting the first signature from the archive file at the second client system;
  determining whether a stored signature on the second client system matches the first signature;
  in response to determining that no stored signature matches the first signature, the second client system requesting from the server system, one of the encrypted second keys encrypted with a public key of a public-private key pair of the second user;
  using a private key of the public-private key pair of the second user, decrypting the one of the encrypted second keys received from the server system into a decrypted second key on the second client system;
  using the decrypted second key, decrypting the encrypted first key into a decrypted first key on the second client system; and
  decrypting the data element with the decrypted first key on the second client system.

5. The method of claim 4, further comprising in response to closing the decrypted data element on the second client system, removing the decrypted first key from memory of the second client system.

6. The method of claim 1, further comprising:
in response to a request at the first client system to read the encrypted data element:
  using a private key of the public-private key pair, decrypting the encrypted second key into a decrypted second key;
  using the decrypted second key, decrypting the encrypted first key into a decrypted first key; and
  decrypting the encrypted data element into a decrypted data element with the decrypted first key.

7. The method of claim 6, further comprising in response to closing the decrypted data element, removing the decrypted first key from memory of the first client system.

8. The method of claim 1, further comprising:
generating a random number; and
using the random number as the first key.

9. A system for protecting a data element, comprising:
at least one processor;
a memory coupled to the at least one processor, wherein the memory is configured with instructions that when executed by the at least one processor cause the at least one processor to perform operations including:
  encrypting the data element with a first key;
  storing a set of permissions in association with the encrypted data element;
  after the generating of the first signature, determining whether a stored signature matches the first signature;
  in response to determining that no stored signature matches the first signature:
    generating a second key, and
    storing the second key in association with the first signature in the memory;
    generating a first signature from the set of permissions for the data element;
    encrypting the first key with the second key;
    storing the encrypted first key in association with the encrypted data element;
    encrypting the second key with a public key of a public-private key pair of a first user; and
    transmitting the first signature and the encrypted second key to a server system for storage.

10. The system of claim 9, wherein the memory is further configured with instructions that when executed by the at least one processor cause the at least one processor to perform further operations including storing the encrypted data element, first signature, encrypted first key, and set of permissions in an archive file.

11. The system of claim 9, wherein the memory is further configured with instructions that when executed by the at least one processor cause the at least one processor to perform further operations including:
for each user of a plurality of users permitted access to the data element, encrypting the second key into a respective encrypted second key with a public key of a respective public-private key pair of the user; and
transmitting the encrypted second key to the server system for storage in association with the first signature.

12. The system of claim 9, wherein the memory is further configured with instructions that when executed by the at least one processor cause the at least one processor to perform further operations including:
in response to a request to read the encrypted data element:
  using a private key of the public-private key pair, decrypting the encrypted second key into a decrypted second key;
  using the decrypted second key, decrypting the encrypted first key into a decrypted first key; and
  decrypting the encrypted data element into a decrypted data element with the decrypted first key.

13. The system of claim 12, wherein the memory is further configured with instructions that when executed by the at least one processor cause the at least one processor to perform further operations including in response to closing the decrypted data element, removing the decrypted first key from memory.

14. The system of claim 12, wherein the memory is further configured with instructions that when executed by the at least one processor cause the at least one processor to perform further operations including:
storing the encrypted data element, first signature, encrypted first key, and set of permissions in an archive file;
in response to the request to read the encrypted data element:
  extracting the first signature from the archive file;
  determining whether a stored signature in the memory matches the first signature;
  in response to determining that no stored signature matches the first signature, requesting from the server system, the encrypted second key.

15. The system of claim 9, wherein the memory is further configured with instructions that when executed by the at least one processor cause the at least one processor to perform further operations including:
generating a random number; and
using the random number as the first key.

* * * * *